United States Patent [19]
Clements

[11] 3,807,638
[45] Apr. 30, 1974

[54] TRAIL LINE MOVES

[75] Inventor: Lloyd W. Clements, Woodland, Calif.

[73] Assignee: Ireco Industries Inc., Eugene, Oreg.

[22] Filed: May 12, 1972

[21] Appl. No.: 252,587

[52] U.S. Cl.................. 239/212, 239/587, 285/190
[51] Int. Cl............................................. A01g 25/02
[58] Field of Search.................... 239/177, 212, 587; 285/190, 213

[56] References Cited
UNITED STATES PATENTS

| | | | |
|---|---|---|---|
| 3,603,508 | 9/1971 | Ingram............................. | 239/212 X |
| 3,088,759 | 5/1963 | Corsette............................ | 285/190 |
| 2,886,346 | 5/1959 | Nixon............................... | 285/190 X |
| 2,741,510 | 4/1956 | McCulloch........................ | 239/213 X |
| 3,193,204 | 7/1965 | Walton et al..................... | 239/212 X |
| 3,516,609 | 6/1970 | Gheen et al...................... | 239/212 |

Primary Examiner—M. Henson Wood, Jr.
Assistant Examiner—John J. Love
Attorney, Agent, or Firm—Klarquist, Sparkman, Campbell, Leigh, Hall & Whinston

[57] ABSTRACT

Trail line irrigation moves have split swivel couplers of which each has two identical halves rotatable on split bearing rings on an axle having seals thereon and coupled to pipe lengths by press-on or clamp-on connector portion. The axle has holes connecting the pipe lengths to the interior of the swivel halves, and the bottom half has a check valve drain and the top half has a cross connector with a sprinkler mounted on the top, a quick connect coupler cross-arms, a plug in one cross-arm and a trail line coupled to one cross arm. The trail line is connected by a quick connection coupler to a reversible skid shoe having a sprinkler riser and a drain plug.

13 Claims, 10 Drawing Figures

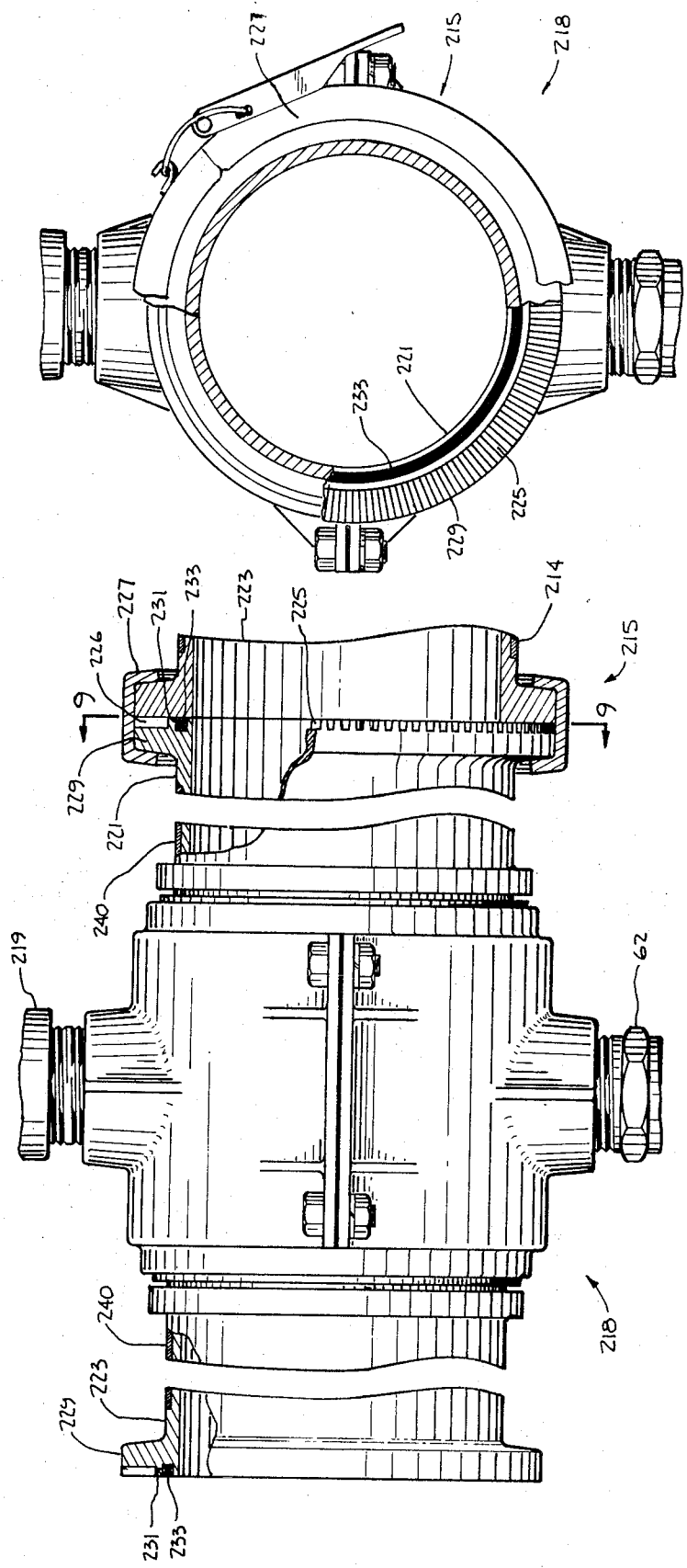

3,807,638

TRAIL LINE MOVES

DESCRIPTION

This invention relates to improved irrigation line moves, and more particularly to improved trail line moves.

An object of the invention is to provide new and improved irrigation line moves.

Another object of the invention is to provide new and improved trail line moves.

Another object of the invention is to provide improved swivel couplers for irrigation lines.

A further object of the invention is to provide swivel couplers having radial-and-thrust bearings.

Another object of the invention is to provide trail line moves having swivel couplers having sloping connectors to trail lines to maintain sprinklers on the connectors in vertical positions.

Another object of the invention is to provide new and improved quick connectors.

Another object of the invention is to provide reversible shoes on trail lines.

Another object of the invention is to provide swivels for couplers, each swivel having identical halves.

Another object of the invention is to provide a trail line move having trail line swivel couplers having press-on coupling portions attachable to line pipe lengths.

Another object of the invention is to provide a trail line move having trail line swivel couplers connected to line pipe lengths by clamp-on connectors.

In the drawings

FIG. 2A is an enlarged, fragmentary, perspective view of the coupler of FIG. 2;

FIG. 8 is an enlarged, fragmentary, partially sectional view of a portion of the trail line move of FIG. 8; and, FIG. 9 is an enlarged, vertical, sectional view taken along line 9—9 of FIG. 8.

Figure 1:
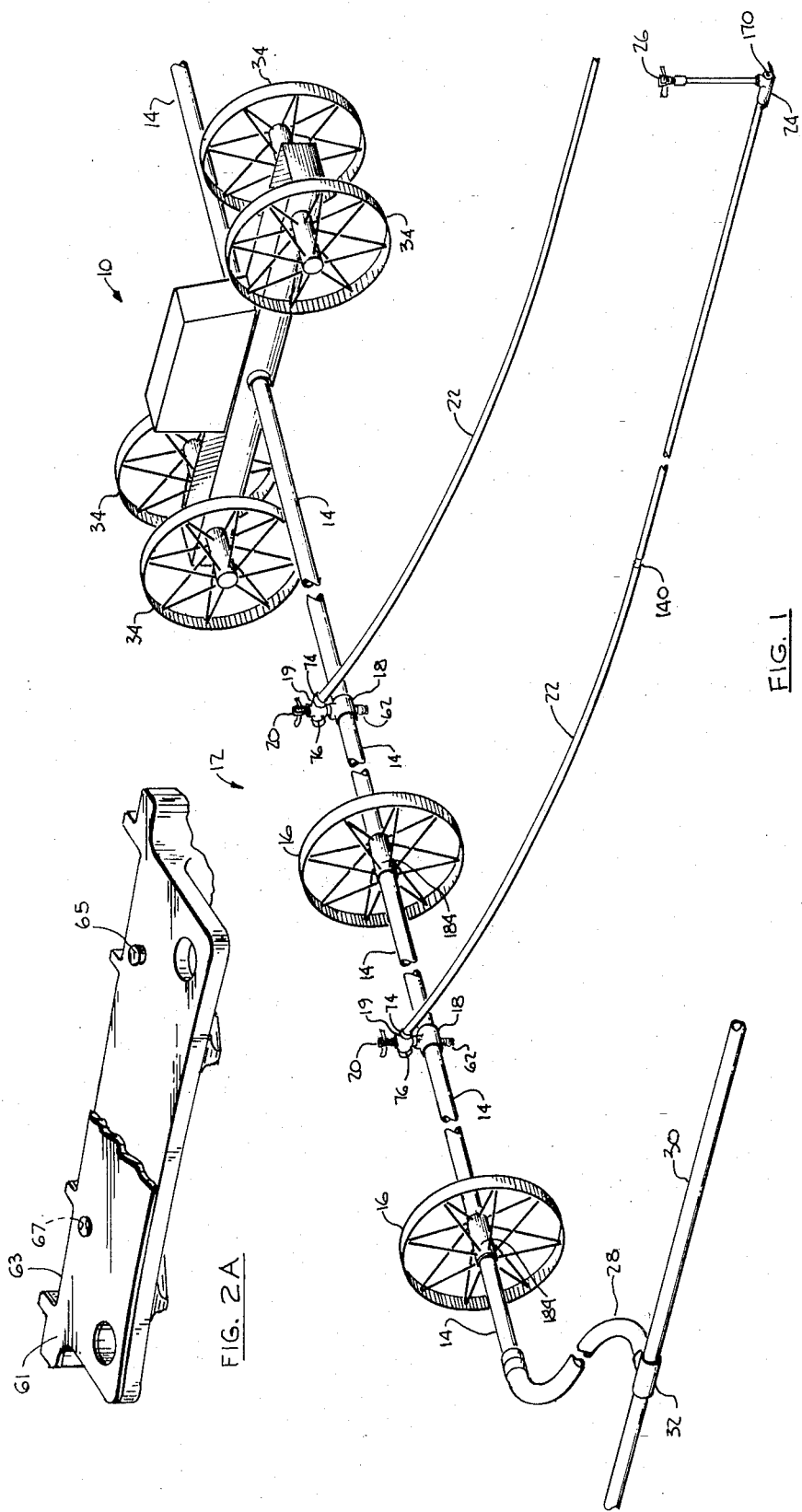
FIG. 1 is a fragmentary, perspective view of a trail line move forming one embodiment of the invention.
Figure 2:
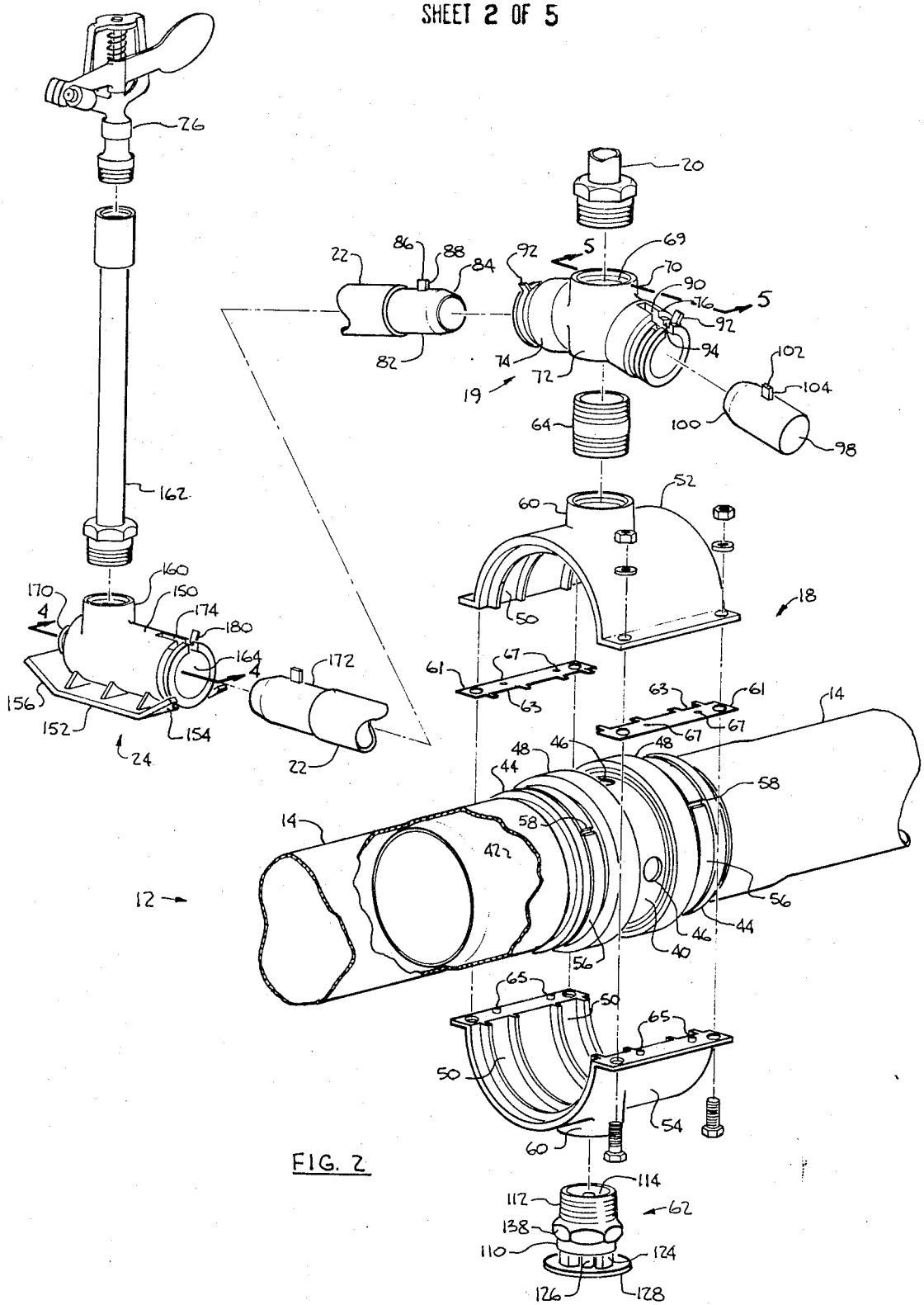
FIG. 2 is an enlarged, exploded, perspective view of a swivel coupler and trail line of the move of FIG. 1.
Figure 3:
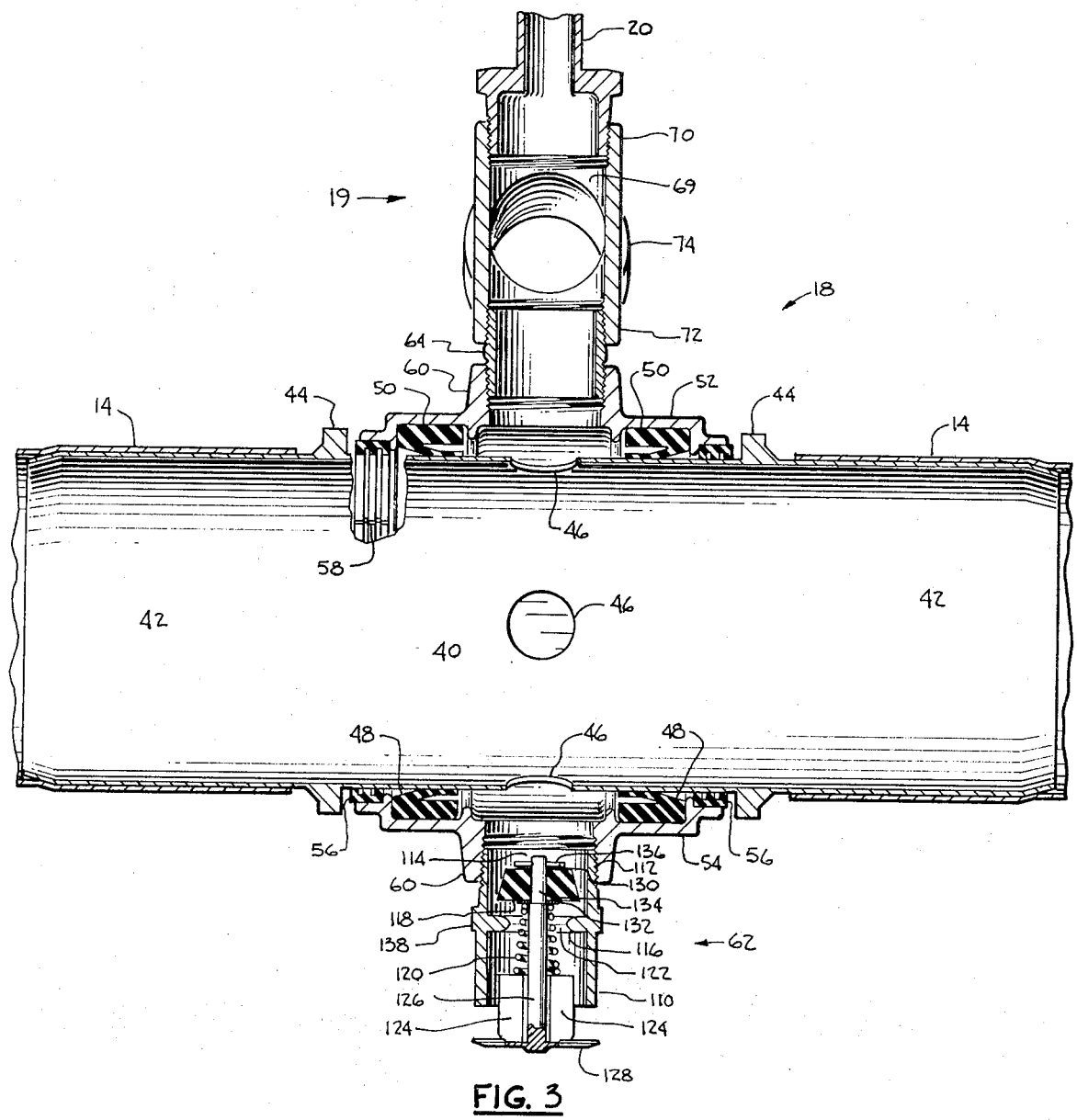
FIG. 3 is an enlarged, vertical, sectional view of the swivel coupler.
Figure 5:
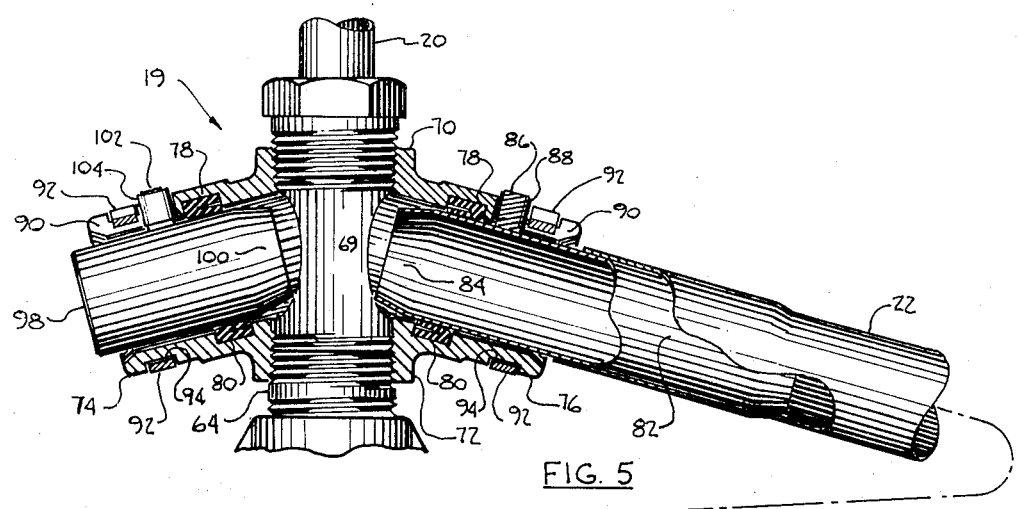
FIG. 5 is an enlarged, vertical sectional view taken along line 5—5 of FIG. 2.
Figure 6:
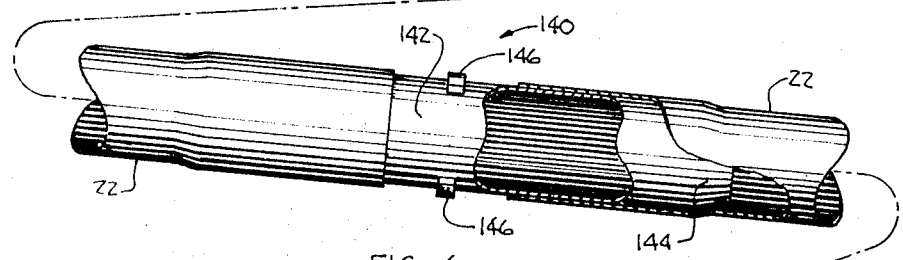
FIG. 6 is an enlarged, fragmentary, vertical, sectional view of a spliced portion of a trail line.
Figure 4:
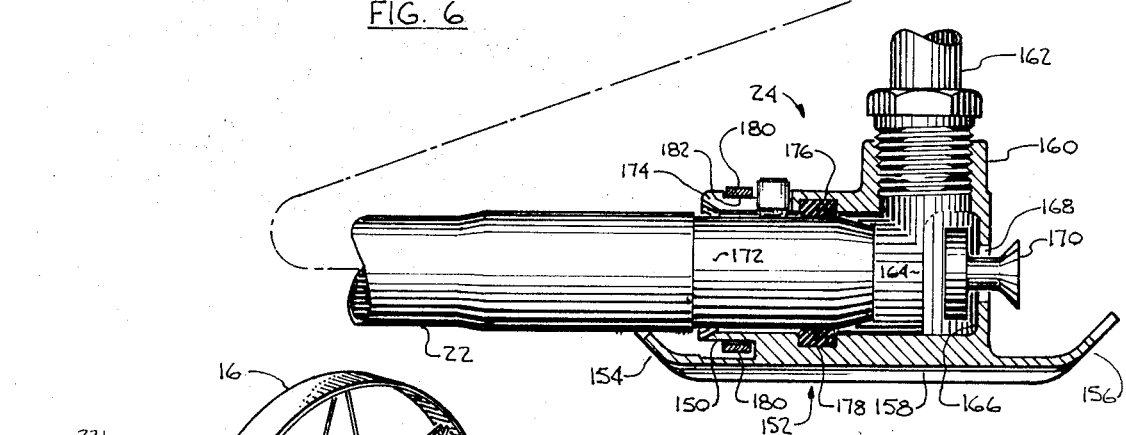
FIG. 4 is an enlarged, vertical, sectional view taken along line 4—4 of FIG. 2.

Referring now in detail to the drawings, there is shown in FIGS. 1-6 an improved trail line move forming one embodiment of the invention and including a wheeled power unit 10 (FIG. 1) which is located at the center of and rotates an irrigation line 12 comprising a series of pipe lengths 14 keyed to wheels 16 and connected to swivel couplings 18 carrying crosses 19 supporting upright sprinklers 20 and coupled to trail lines 22 coupled to reversible shoes or skids 24 carrying upright sprinklers 26. The end pipe length 14 is coupled by a rotary coupling to a hose 28 connected to a mainline pipe 30 having outlets 32 spaced appropriately therealong. The power unit 10, to move the line move, drives its wheels 34 and rotates the pipe lengths 14, which rotate the wheels 16. The swivel couplings 18 permit the pipe lengths to rotate and move the trail lines 22 therewith.

Each swivel coupling 18 includes an axle or tube 40 (FIG. 3) having press-in connector portions 42 which are pressed into the pipe lengths 14 to rigidly and keyingly connect the adjacent pipe lengths together. Thrust collars 44 are welded to the axle and the axle has four ports 46 midway between the collars. Chevron type, rubber sealing rings 48 sealingly engage the axle and fit into grooves 50 in identical swivel halves 52 and 54, which are journalled on lubricant impregnated polyethylene split bearing rings 56. Each of the bearing rings is continuous except for one transverse split or slit 58 which permits the bearing ring to be flexed sufficiently to be passed over the collar 44 for assembly of the bearing ring on the axle, the rings 50 being sufficiently stretchable to be passed over the collars. Side sealing gaskets 61 of rubber impregnated asbestos seal the two halves 52 and 54 and have edges 63 sealingly engaging the seals 48, the gaskets 61 being precisely positioned by dowel pins 65 which fit in holes 67 to make the edges 63 flush with the inner periphery of the halves. The dowels fit into holes 69 in the opposite flanges of the adjacent coupling half to precisely align the two halves 52 and 54. Flanges 51 of the halves are crowned (as shown in somewhat exaggerated form in FIG. 2A) so as to exert pressure on the central portions of the gaskets substantially as great as at the bolts which clamp the flanges together. The crowning between the bolt holes should be between about 0.005 and 0.009 of an inch for a spacing between centers of the bolt holes of about 3.875 inches.

The halves 52 and 54 have tapped bosses 60, a normally open check valve 62 being screwed into the boss in the half 54 and a close nipple 64 being screwed into the boss 60 of the half 52.

Each cross 19 (FIG. 3) includes a vertical bore 69 having a tapped upper portion 70 and an aligned, tapped, lower portion 72 screwed onto the close nipple 64, one of the sprinklers 20 (FIG. 1) being screwed into the tapped upper portion 70. Symmetrically located, identical, tubular cross-arms 74 and 76 (FIG. 5) slope downwardly from the bore 69 each at an angle of about 15° to the horizontal. Chevron type seals 78 of rubber or the like are inserted into and retained in annular grooves 80 in the cross-arms. A press-in tubular coupler 82 is pressed into and rigidly secured thereby to trail line 22, which may be an aluminum pipe. The coupler 82 may be quickly attached and sealed to and detached from either cross-arm 74 or 76. The coupler 82 has a tapered nose portion 84 and extends through the seal 78 in sealing engagement therewith. A keying or splining bar 86 welded to the coupler 82 and a rubber bumper sleeve 88 bonded to the bar 86 is slid into a keying slot 90, and is retained therein by a split spring latching band 92 rotatable in groove 94 and normally held against rotation by an inwardly bent, generally U-shaped detent portion 96, which projects into the slot 90. A plug 98 having a tapered nose portion 100 is quickly insertable into and removable from either arm 74 or 76, and has a keying bar 102 and rubber bumper sleeve 104 fitting into the keying slot 90. The plug normally is held in sealing position in the arm 74 or 76 by the latching band 92.

The drain valve 62 (FIG. 3) includes a body 110 having a threaded end portion 112 screwed into tapped boss 60. The body has a counterbore 114 and an annular land or valve seat 116 against which an elastomer, tapered valve member 118 is pressed into sealing engagement by operating water pressure when the line is supplied with water from the mainline 30 (FIG. 1). When the water is cut off to the line 12 from the mainline 30, the water pressure drops and a spring 120 (FIG. 3) presses the valve member 118 to an open position to permit the water to drain through orifice 122 and through spider-like, rod-guiding portion 124 which guides rose-like valve stem 126 and the water is spread by a dished, disc-like spreader 128. The member 118 is secured on the valve stem 126 between washers 130 and 132 held on a reduced end portion 134 by a cotter pin 136. A hexagonal driving portion 138 is provided on the body 110.

The trail line 22 (FIG. 2) may have placed therein, when necessary for repairs, a press-in repair sleeve 140 (FIG. 6) which comprises a tubular body 142 having tapered ends 144 and pressed expandingly into cut-apart sections of the trail line 22 to rigidly connect the sections. Stop members 146 prevent either end of the sleeve 140 from being pressed over half way into one of the sections of the trail line.

Each shoe 24 (FIGS. 2 and 4) includes a hollow body 150 and a double-ended skid or base 152 having upsloped end portions 154 and 156, and a central, suction preventing groove 158. The body has a vertical, tapped boss 160 into which sprinkler riser 162 (FIG. 2) is threaded, and also has a bore 164 having a cylindrical surfaced end portion 166 and a drain port 168 closed by a mushroom valve 170 by water pressure when the mainline is connected to the line move and open when the mainline is shut off from the line move. A coupler 172, identical to the coupler 82, connects the trail line 22 to the interior of the shoe 24 which has a quick coupler structure like that of the cross-arms 74 and 76 and including a keying slot 174, a chevron-type seal 176 in a groove 178 and a split latching ring 180 in groove 182.

In its operation, with the water supply from the mainline pipe 30 (FIG. 1) shut off from the move and the water drained from the move by the check valve structures 62 and 170 of the rotary couplings 18 and the shoes 24, respectively, the power unit 10 is operated to turn the wheels 34 and to turn the pipe lengths 14 and the wheels 16 to move the line to the next operating station. The assembly of pipe lengths 14 and the axles 40 rigidly connected thereto at both sides of the power unit 10 act as drive shafts or torque tubes to turn the wheels 16, which are pressed into and thereby keyed to tubular axle portions 184 of the wheels 16. The line move is quite long, one-quarter mile in a typical construction, and the pipe lengths, which are typically aluminum, flex rotatably so that the ends of the line lag somewhat behind the center portion of the line where the power unit 10 is located. In order to have the sprinklers 20 and 26 along straight lines, it is desirable to have the line straight when it is irrigating at which time the line move is stationary. To accomplish this at the end of each movement, the power unit 10 is reversed until it comes even with the endmost wheels 16, and at least the trail lines 22 away from the ends of the move are slid backwards or in reverse, the pipes of the trail lines being sufficiently stiff to slide the shoes 24 backward, the shoes having the reversible skid portions 156 to facilitate this reverse. During both forward and reverse movement, the sprinklers 20 remain upright due to the slope of the cross-arms 74. After alignment, water is again supplied to the move and the sprinklers 20 and 26.

When the line move reaches an end of the field, the trail lines are reversed. This may be accomplished by disconnecting the trail lines 22 from the cross-arms 74, moving the plugs 98 from the cross-arms 76 and into the cross-arms 74, and then either swinging the trail lines 180° to the other side of the move and connecting the trail lines to the cross-arms 76 or by moving the move in reverse over the trail lines, disconnecting the shoes 24 from the trail lines, connecting the freed ends of the trail lines to the cross-arm 76 and connecting the shoes 24 to the other ends of the trail lines. Water then may be reconnected to the move for sprinkling the end portion of the field, after which the move can be moved back over the field.

EMBODIMENT OF FIGS. 7–9

Figure 7:
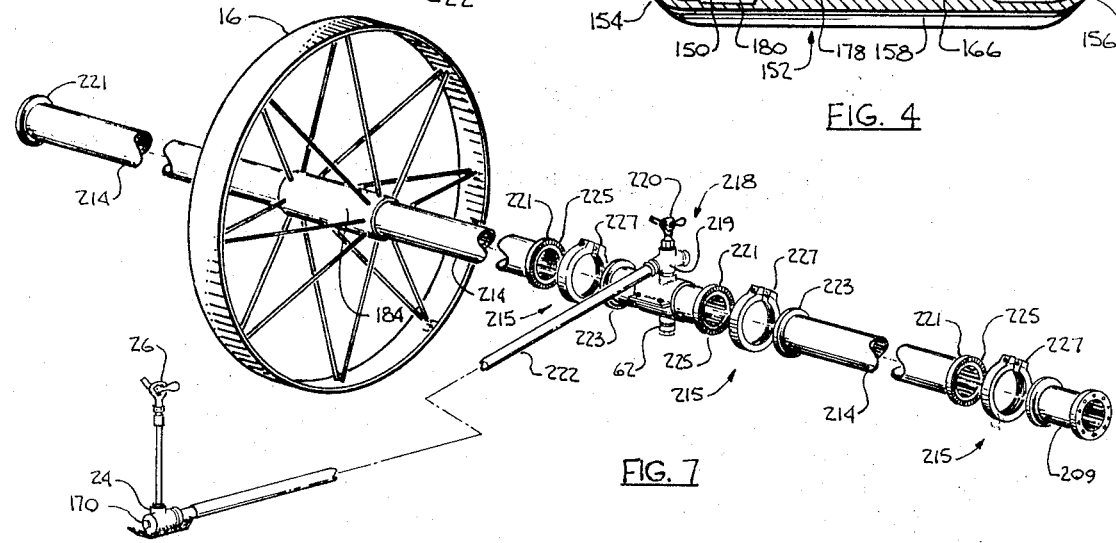
FIG. 7 is an exploded, fragmentary, perspective view of a trail line move forming an alternate embodiment of the invention.

A line move forming an alternate embodiment of the invention and shown in FIGS. 7–9 is substantially identical to the line move of FIGS. 1–6 except as brought out below. The move of FIGS. 7–9 includes pipe lengths 214 connected by tubular torque couplers 215 to each other and to swivel couplers 218 and to mover adapters 209 connected to a power unit (not shown) like the power unit 10. The torque couplers include press-in sleeves 221 and 223 rigidly connected to swivel coupler axles 240 and the pipe lengths 214. The sleeves 221 and 223 have radial flanges 229 provided with intermeshing ring gear-like teeth 225 and 226 and held together by expansible, lockable, channel-like hold bands 227. The swivel couplers 218 are identical with the couplers 18 except that the axles are adapted to receive the press-in sleeves 221 and 223. The flanges 229 have face grooves 231 holding cross-shaped rubber sealing rings 233 pressed into sealing engagement with each other. The swivel couplings carry crosses 219, which are like the crosses 19, and carry sprinklers 220. The swivel couplings also pull (or push) trail lines 222 like the trail lines 22.

What is claimed is:

1. In a line move,
   a pipe having lateral ports,
   a pair of annular seals on the pipe at opposite sides of the ports,
   a pair of annular antifriction bearing members on the pipe at opposite sides of the ports,
   a tubular swivel housing journalled on the bearing members and sealingly engaging the annular seals and having an exit port,
   the swivel housing having a first pair of internal grooves at the ends thereof receiving the annular bearing members and also having a second pair of internal grooves receiving the annular seals,
   and sprinkler means on the swivel housing.

2. The line move of claim 1 including a pair of thrust members secured to the pipe and bracketing the bearing members,
   the bearing members being split so that they can be expanded and passed over the thrust members.

3. The line move of claim 2 wherein the annular seals are stretchable sufficiently to be passed over the thrust members.

4. The line move of claim 2 wherein the tubular housing is longitudinally split and has flanges adjacent the split.

5. The line move of claim 4 including a gasket between the flanges forming a smooth interior with the portions of the housing adjacent the split.

6. The line move of claim 1 including a pair of thrust members secured to the pipe and limiting axial movements of the bearing members along the pipe in directions away from the midpoint of the swivel housing,
the first pair of grooves limiting axial movements of the bearing members toward the midpoint of the swivel housing.

7. The line move of claim 6 wherein the bearing members are collars fixed to the pipe,
the bearing members being split so that they can be expanded and passed over the collars.

8. The line move of claim 1 wherein the bearing members are lubricant impregnated rings.

9. The line move of claim 6 wherein the bearing members are lubricant impregnated rings.

10. In a line move,
a move line including rotatable horizontal pipe and means supporting the pipe in a position elevated above the ground,
means for moving the line laterally,
a swivel coupler sleeve on the pipe for receiving water from the pipe and having an exit port at the upper side thereof,
a pipe connector secured to the coupler sleeve at the exit port and having a vertical connection portion and also having a downwardly sloping connection portion,
a sprinkler skid on the ground,
a trail line connected to the skid and to the downwardly sloping connection portion,
a first sprinkler connected to the vertical connection portion and held upright thereby,
and a second sprinkler connected to the sprinkler skid,
the trail line being somewhat flexible and extending along a catenary between the pipe connector and the ground, the downward slope of the downwardly sloping connection portion being such as to maintain the first sprinkler vertical when the trail line is moved by the move line.

11. The line move of claim 10 wherein the sprinkler skid is double-ended so that it may be slid in either direction and the trail line being sufficiently stiff to push the skid in the reverse direction.

12. The line move of claim 10 wherein the downward slope of the forwardly sloping connection portion is about 15°.

13. The line move of claim 10 wherein the pipe connection has a second downwardly sloping connection portion positioned 180° from the first-mentioned downwardly sloping connection portion,
and plug means adapted to selectively plug either of the downwardly sloping connection portions.

* * * * *